United States Patent
Hui et al.

(10) Patent No.: US 10,366,395 B2
(45) Date of Patent: Jul. 30, 2019

(54) INTERACTIVE AND CUSTOM-SUPPORT KIOSK, METHODS AND SYSTEM

(71) Applicant: InFocus Corporation, Portland, OR (US)

(72) Inventors: Lap-Shun Hui, Long Beach, CA (US); John Lee, Los Altos Hills, CA (US); Raymond Yu, Fremont, CA (US)

(73) Assignee: INFOCUS CORPORATION, Portland, OR (US)

( * ) Notice: Subject to any disclaimer, the term of this patent is extended or adjusted under 35 U.S.C. 154(b) by 493 days.

(21) Appl. No.: 14/683,457

(22) Filed: Apr. 10, 2015

(65) Prior Publication Data

US 2015/0294318 A1     Oct. 15, 2015

Related U.S. Application Data

(60) Provisional application No. 61/978,700, filed on Apr. 11, 2014.

(51) Int. Cl.
*G06Q 30/00* (2012.01)

(52) U.S. Cl.
CPC .................. *G06Q 30/016* (2013.01)

(58) Field of Classification Search
CPC ..................................... G06Q 30/016
See application file for complete search history.

(56) References Cited

U.S. PATENT DOCUMENTS

| | | | | |
|---|---|---|---|---|
| 6,097,806 A | * | 8/2000 | Baker | H04M 3/5183 379/265.12 |
| 8,600,036 B1 | * | 12/2013 | Warder | H04M 3/523 379/265.11 |
| 2001/0011680 A1 | | 8/2001 | Soltesz et al. | |
| 2002/0054097 A1 | * | 5/2002 | Hetherington | G06F 9/4448 715/762 |
| 2008/0300860 A1 | | 12/2008 | Marlow et al. | |
| 2010/0036670 A1 | | 2/2010 | Hill et al. | |
| 2012/0030709 A1 | * | 2/2012 | Gibbon | H04N 21/84 725/40 |
| 2012/0233002 A1 | * | 9/2012 | Abujbara | G06Q 10/06 705/15 |

(Continued)

FOREIGN PATENT DOCUMENTS

WO     2008084406 A2     7/2008

*Primary Examiner* — Mandrita Brahmachari
(74) *Attorney, Agent, or Firm* — McCoy Russell LLP

(57) ABSTRACT

An interactive and custom support kiosk is disclosed. In one embodiment, a kiosk is provided including a user attribute identification system and a region-specific linkage. The user attribute identification system may be a user language identification system where the user's preferred language may be detected. With detection of a user's preferred language, the kiosk may display a language-customized display with customized features based on the identified language. In some embodiments, the customized features may include a language-based experience format similar to a user's experience which would be expected in the user's home geography. In some examples, a second level of interaction may be provided wherein the user may be connected to a region-specific operator. The operator may provide immediate live help or assistance through the kiosk. In addition, security controls may be provided with the interactive language and custom support kiosk.

18 Claims, 9 Drawing Sheets

(56) References Cited

U.S. PATENT DOCUMENTS

| | | | |
|---|---|---|---|
| 2012/0323707 A1* | 12/2012 | Urban | G06Q 50/12 705/15 |
| 2013/0019182 A1* | 1/2013 | Gil | G06F 3/0482 715/738 |
| 2013/0138421 A1* | 5/2013 | Moulder | G06F 17/28 704/3 |
| 2013/0191170 A1 | 7/2013 | Jarrett et al. | |
| 2013/0215275 A1 | 8/2013 | Berini et al. | |
| 2013/0266925 A1 | 10/2013 | Nunamaker, Jr. et al. | |
| 2014/0214400 A1* | 7/2014 | Duyaguit | G06F 17/275 704/8 |
| 2015/0186357 A1* | 7/2015 | Oldham | G10L 15/005 704/8 |

* cited by examiner

INTERACTIVE AND CUSTOM-SUPPORT KIOSK, METHODS AND SYSTEM

CROSS-REFERENCE TO RELATED APPLICATIONS

This present application claims priority to U.S. Provisional Patent Application No. 61/978,700 entitled "INTERACTIVE AND CUSTOM-SUPPORT KIOSK, METHODS AND SYSTEM," filed on Apr. 11, 2014, the entire contents of which are hereby incorporated by reference for all purposes.

FIELD OF INVENTION

The present disclosure relates generally to kiosks, and specifically, to an interactive and custom support kiosk and associated systems and methods for using an interactive and custom support kiosk.

BACKGROUND AND SUMMARY

Companies have become more aware of the needs to address language and custom requirements of their consumers. However, servicing the needs of these consumers in regards to each of their potential language differences is difficult. These obstacles become even greater where the services are automated and/or partially automated, such as, services related to banking, food service (e.g. restaurants, fast food), retail checkouts, registration services, etc. Current solutions have focused on full service teller and direct human interaction on one end and automated kiosk machines, such as ATM machines, food ordering touchscreens, on the other end. The full service teller option is expensive and may not meet all the needs of the potential consumers. Kiosk machines are generally limited in providing complex services or addressing difficulties which may arise in use of the kiosk.

Specifically, kiosk machines have become an alternative source to avoid the need of a full service teller option. These kiosk machines, also referred to as kiosks, have been used in a number of environments. For example, kiosks may be used to handle commercial or retail transactions. In other examples, kiosks may be used for verification transactions, such as airline ticketing, drivers' licenses and renewals, passport control, etc.

The inventors herein have recognized a number of difficulties with the current kiosks systems. Specifically, the current kiosks systems may be difficult for travelers or non-native speakers to use. Current users of kiosks further suffer from difficulties in regards to unfamiliarity with the presentation, questions or instructions issued from the kiosks. Moreover, users may find it difficult to maneuver through the interfaces on the kiosks to initiate and use complex services. Furthermore, concerns may arise due to security problems during use of the kiosks. Frustration with the kiosks may result in a user terminating or not engaging in a business's service.

In light of the difficulties identified by the inventors, the inventors herein provide an interactive and custom-support kiosk. In one embodiment, the interactive and custom-support kiosk is provided including a user attribute identification system and a region-specific linkage. The user attribute identification system may be a user language identification system where the user's preferred language may be identified through a language identification system. With detection of a user's preferred language, the kiosk may display a language-customized display with customized features based on the identified language. In some embodiments, the customized features may include a language-based experience format similar to a user's experience which would be expected in the user's home geography. In some examples, a second level of interaction may be provided wherein the user may be connected to a region-specific operator. The operator may provide immediate live help or assistance through the kiosk. In addition, security controls may be provided with the interactive language and custom support kiosk.

Through the use of the disclosed interactive language and custom support kiosk, it may be possible to share human resources on a global basis. Language specific routing through the region-specific linkages enables load-balancing and provides options for peak time handling. Further, in some examples, the interactive and custom-support kiosk, in combination with the region-specific linkages, provides an opportunity for late-night 24 hour service as well as late-night secured order and delivery. The region-specific linkages further may enable a company to interact with its consumers and provide opportunities for personal and customized recommendations, specials and upsell opportunities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
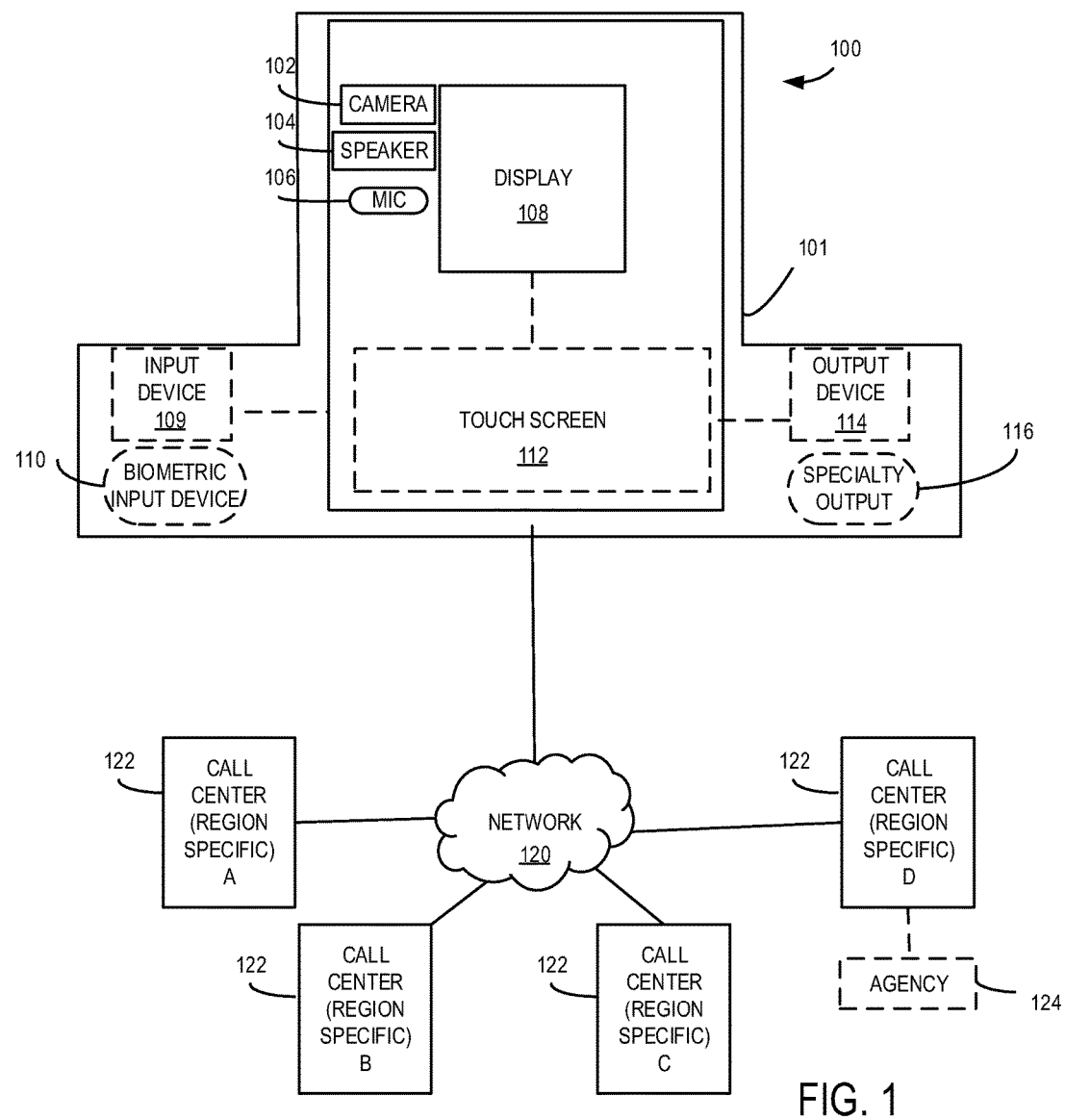
FIG. 1 illustrates through a block diagram an example interactive and custom support kiosk and system including a language identification system and a region-specific linkage in accordance with an embodiment of the present disclosure.
Figure 2:
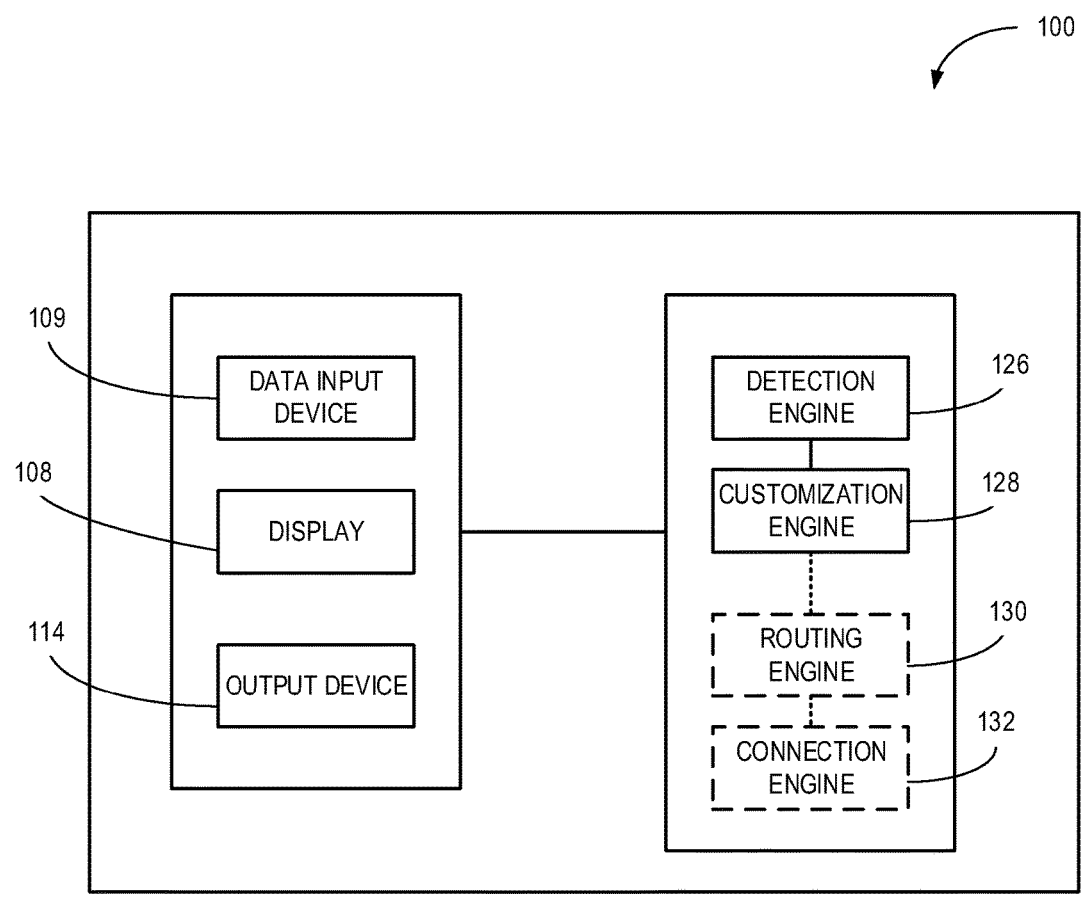
FIG. 2 illustrates the communication between the user attribute identification system and a region specific linkage in accordance with an embodiment of the present disclosure.
Figure 3:
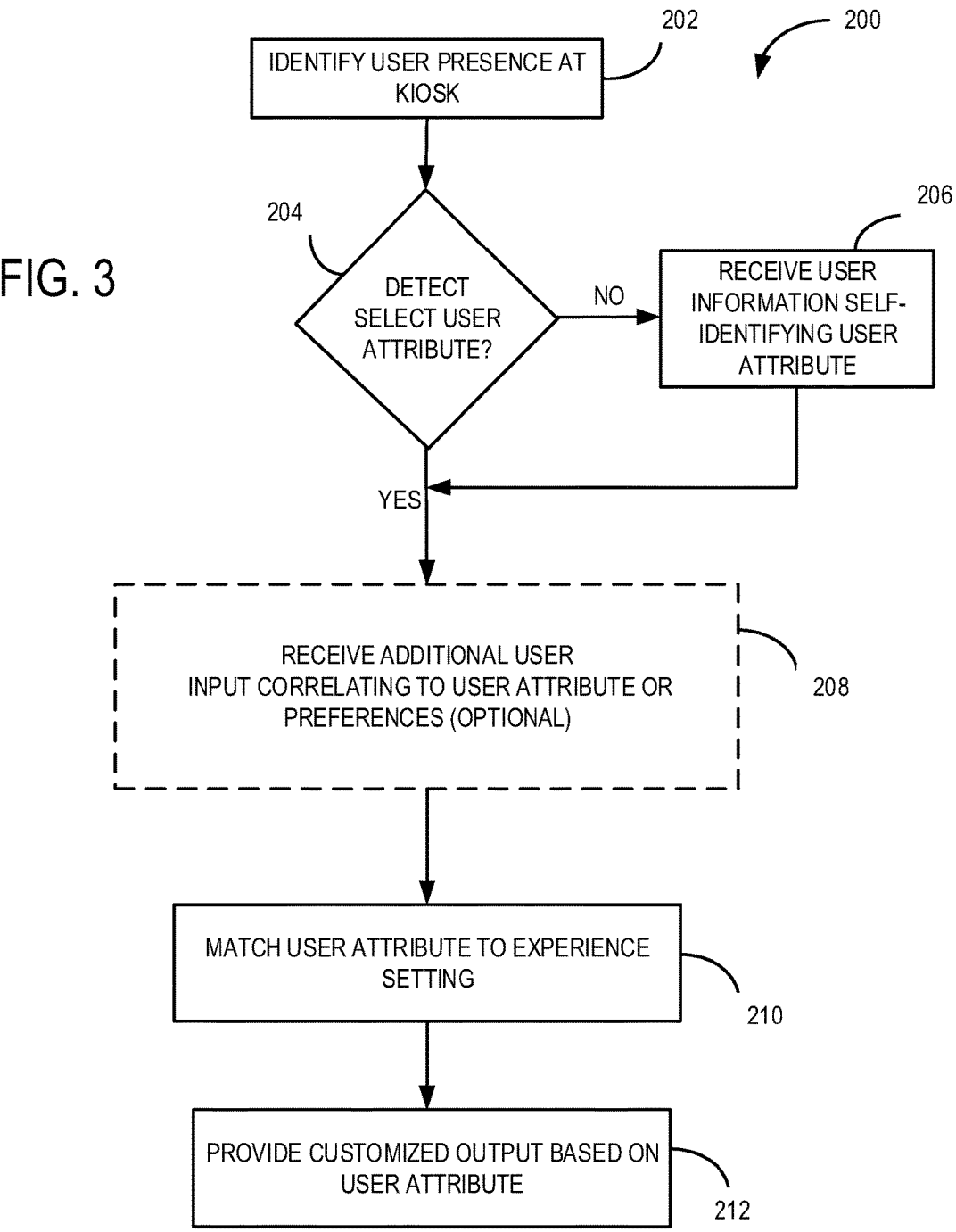
FIG. 3 is a flow chart of an example method for an interactive and custom support kiosk in accordance with an embodiment of the present disclosure.
Figure 8:
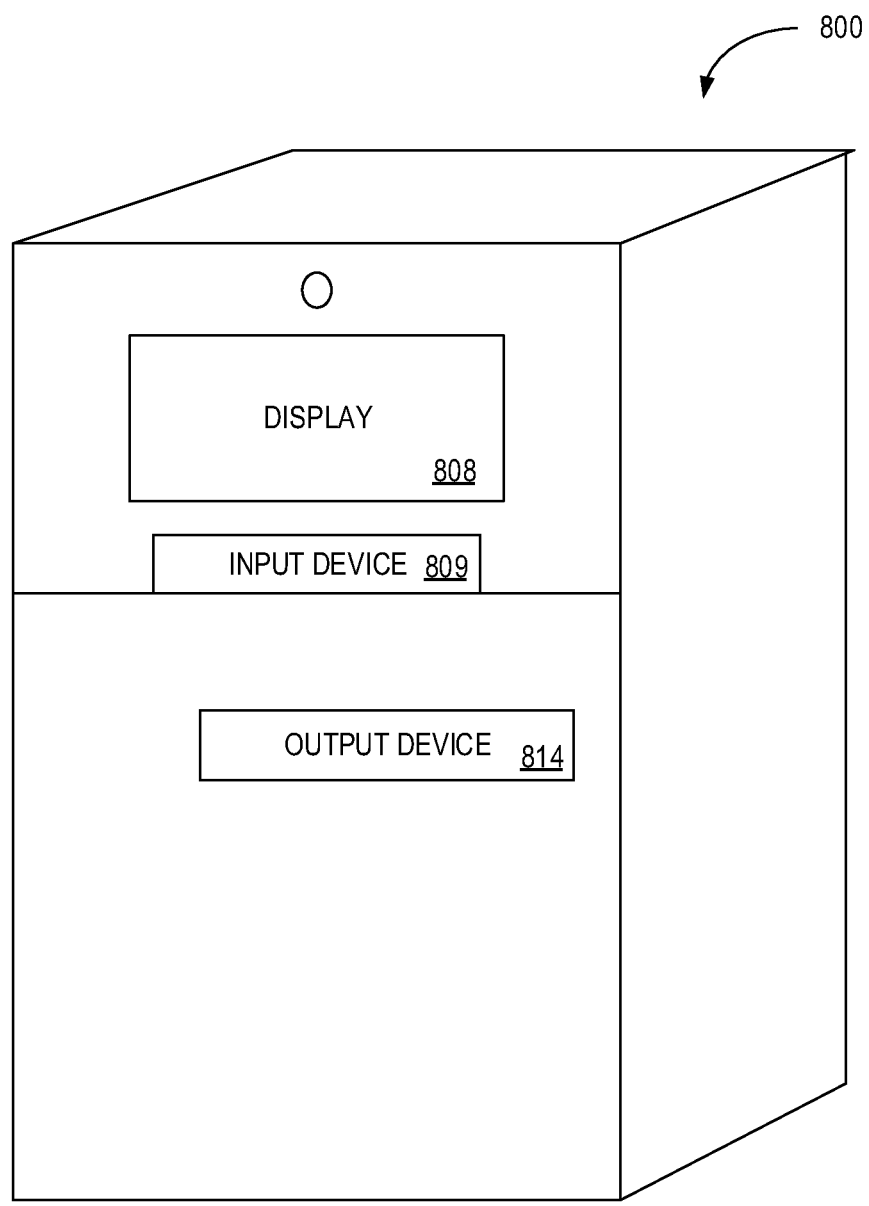
FIG. 8 illustrates an example interactive and custom support kiosk in accordance with an embodiment of the present disclosure.
Figure 9:
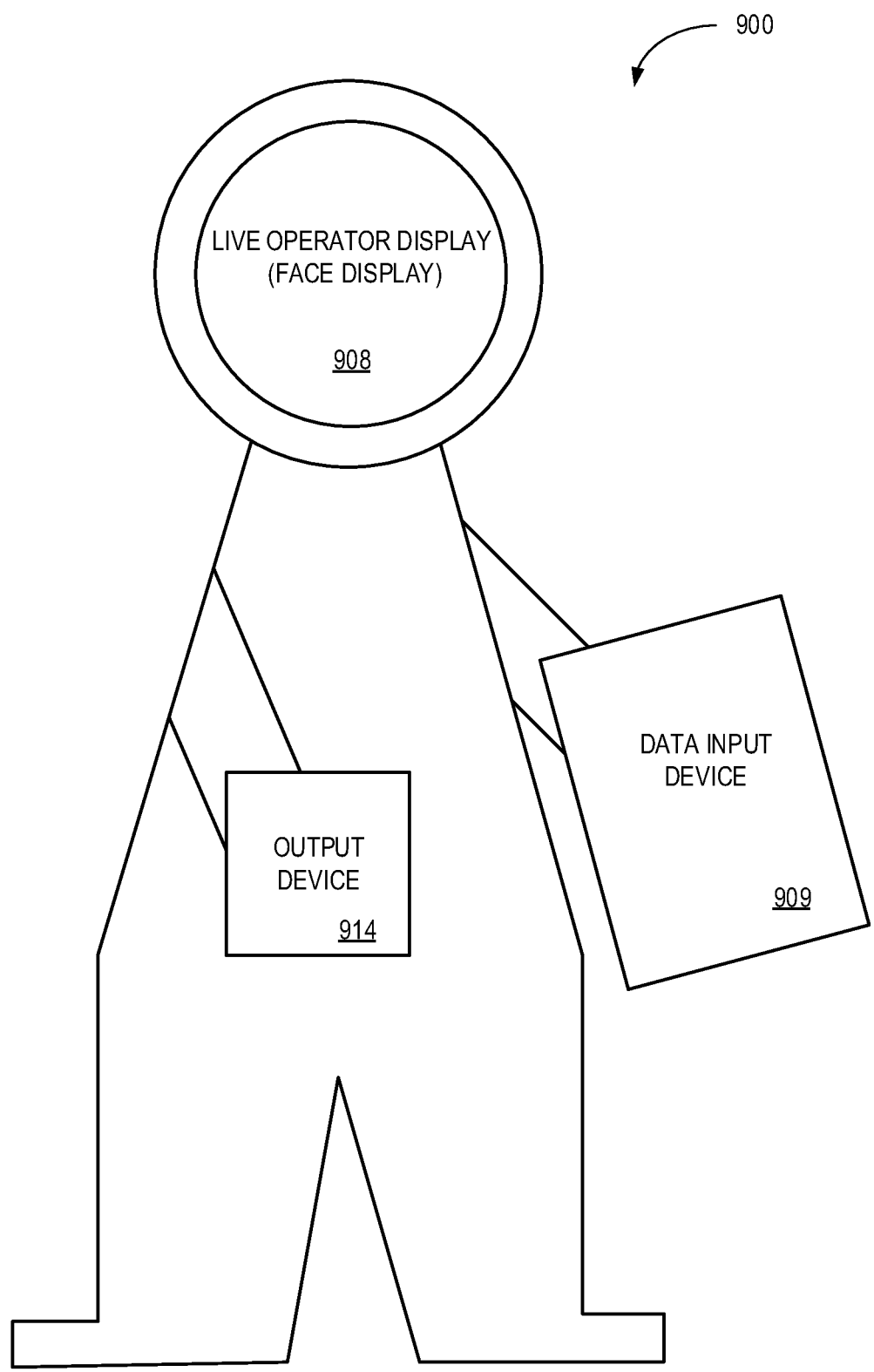
FIG. 9 illustrates a further example interactive and custom support kiosk in accordance with an embodiment of the present disclosure.

As described in more detail below, an interactive and custom support kiosk, methods and systems are disclosed herein. FIG. 1 illustrates an example interactive and custom support kiosk and system including a user-attribute identification system and a region-specific linkage in accordance with an embodiment of the present disclosure. FIG. 2 further illustrates the user attribute identification system and a region specific linkage. FIG. 3 provides a method of use of the interactive and custom support kiosk and system. FIGS. 4-7 provide further examples of use of the interactive and custom support kiosk. FIGS. 8 and 9 illustrate example kiosks.

As described in more detail below, the interactive and custom support kiosk and methods and systems may include a user attribute identification system and a region-specific linkage. The user attribute identification system may be a user language identification system where the user's preferred language may be detected or self-identified by the user. With detection of a user's preferred language, the kiosk may display a language-customized display with customized features based on the identified language. In some embodiments, the customized features may include a language-based experience format similar to a user's experience which would be expected in the user's home geography. As such, the kiosk may replicate a user's expected experience regardless of the location of the customer. Further, the overall experience may be configured to match the user's needs. In some examples, a second level of interaction may be provided wherein the user may be connected to an operator, such as for example, a live agent, a live operator, a call center agent or user-selected operator. In some examples, the operator may be a region-specific operator.

The operator, such as the region-specific operator may provide immediate/real-time live help or assistance through the kiosk. The region-specific operator may be selected based on user attributes, such as preferred or selected language, age of the user, cultural preferences, and/or the identification of a disability of the user (e.g. deafness, blindness, or speech impairment). In addition, security controls may be provided with the interactive language and custom support kiosk.

The interactive and custom support kiosk enables a shared resource model. For example, the region-specific linkage and the language-specific routing enables call centers and live support centers to support any number of kiosks to improve load balancing and peak time handling. Further, the disclosed system provides for late night and 24 hour services, including secured order and delivery. Moreover, in some embodiments, the language-specific routing enables a live agent/live operator to interact directly with the kiosk user. For example, the live operator may provide customized assistance to the user through audio and video and/or through entering information on a display for viewing at the terminal by the user. As such, consumers as users of the kiosk are able to receive directed information to the consumer, including, but not limited to, assistance with use of the kiosk, verification of information, interview (such as passport interviews), recommendations, notices of specials and other offerings. The directed information may be in the form of customized and interactive communications.

FIG. 1 schematically shows an embodiment of an interactive and custom-support kiosk system 100 in accordance with the present disclosure. In one example embodiment, interactive and custom-support kiosk system 100 may include a kiosk 101 linked to a communication network 120.

For illustration purposes only and not as a limitation, the kiosk may be configured for use for a bank, restaurant, fast food restaurant, supermarket checkout, airline check in, vehicle registration, driver license application and renewal, passport applications, ticket issuance, etc.

Kiosk 101 may be configured for use by a user. The kiosk may include a camera 102, a speaker 104, a microphone 106, and a display 108. The display may be a touch screen 112 or may be linked to a touch screen or other input device, indicated generally at 109, such as a keyboard, etc. Kiosk 101 may also include a network connection enabling direct connectivity functionality such as Bluetooth, local wireless networking, Near Field Communication (NFC), or any other suitable direct data exchange method. Each of the components may be integrated as part of the kiosk.

Input device 109 may further include scanners and other devices to receive user input. For example, input device 109 may provide for acceptance of documents, such as, but not limited to, tickets, passports, identification cards, fare validation receipts, etc.

In some embodiments, kiosk 101 may include additional input devices, (including, in some examples a biometric input device 110). The exemplary biometric input device 109 may enable increased identification capabilities, including, but not limited to fingerprint identification, palm print identification, retina scan, etc.

Moreover, in some examples, the kiosk may include one or more output devices 114, including specialty output devices 116. Specialty output devices may include specialty printers or other like device such that the kiosk may provide ticket output, stamps, stickers, etc. For example, the system may provide for specialty outputs for issuance of driver's licenses or passports. Further, specialty output devices 116 may be configured to provide specialized output based upon an identified user attribute. For example, specialty output devices 116 may provide a braille output for a user with an identified visual impairment.

In some examples, the kiosk may be connected to network 120. The network may include wired and/or wireless communication with one or more different communication protocols to one or more computing devices or services. This network forms a communication system. As non-limiting examples, the communication system may be configured for communication via a wireless telephone network, or a wired or wireless local- or wide-area network. In some embodiments, the communication system may allow a computing system to send and/or receive messages to and/or from other devices via a network, such as a private or public network, including, but not limited to the Internet.

Trigger events may provide access to a live person at a global or regional call center. These trigger events may be based on a request for further assistance, request for live operator, input selection, request for verification or confirmation of information, interview requests, time lapses between inputs, etc. In this manner, the system provides multi-level interactive customization support to a user. First, the system may be customized to the user based on a user attribute detection. The detection of the user attribute identifies the user as a part of a group such that a first level customization (group customization) is provided. The live operator provides a second level of customization (individual customization) where the user is able to directly interact with a live operator who can directly address the user's needs and customize responses for the specific user.

As illustrated, the communication system may provide access to call centers 122. The plurality of call centers accessible by the language identification system 100 enables matching of call center agents, also referred to herein as operators, with users based on an identified user-attributes, such as language, age, etc. A secure connection may be established between the kiosk 101 and a call center 122 regionally specific to the current user.

In some examples, language identification system 100 may enable visual and audio communication between a user and an operator. Camera 102 and microphone 106 may enable an operator to see and hear a user in real time and vice versa. Speaker 104 and display 108 may enable a user to see and hear an operator. Two-way audio and visual interaction, such as video conference interaction may enable the user and operator to mutually see each other and talk to each other. The live person contact may enhance the user's experience and enable the operator to better service the user. For example, the live person may provide recommendations, specials specific to the user, demonstrations and training on using the kiosk, assistance, etc.

In some examples, interaction between the operator and user may be enhanced through the use of a user input device, such as touch screen 112. For example, a operator may control the information provided on display 108 and verbally assist a user in making selections on touch screen 112.

The live operator may provide services to the user and/or may provide verification of identity of the user. The live operator provides opportunities to continue to provide efficient service to users even during peak use times as the call centers can handle loads from different parts of a country or region at different times. The language routing further enables load balancing.

In some examples, after connection of the kiosk to user specific call center 122, a connection may be established to an agency 124. The agency may be an administrative office or government office. In other examples, the agency may be a secondary connection which the call center may be able to link or communicate. For example, a user may use a kiosk for issuance of regulated documents, such as a passport or driver's license. The user may input a past driver's license, passport or other identification into the kiosk through the input device. A live operator may be triggered as the user progresses through the application processing the request for a renewal. The live operator may conduct an interview or other security measure to ensure identity of the user. In some situations, a third party agency, such as the passport agency, may be linked to the live operator such that security verifications can be confirmed and formal documents approved. If the user establishes the proper documentation and meets the security clearance, the kiosk may print the passport or other document.

Turning now to FIG. 2 a further illustration of an interactive and custom-support kiosk and system 200 is provided. Interactive and custom-support kiosk and system 200 may include display 108, data input device 109, output device 114, detection engine 126, customization engine 128, and optionally or additionally routing engine 130 and connection engine 132. As shown in simplified form, the interactive and custom-support kiosk and system 200 includes a computer system used to perform methods and processes described herein. The methods and processes may be tied to one or more computing machines and may be implemented as a computer-application program or service, an application-programming interface (API), a library, and/or other computer-program product.

Although not shown, it should be appreciated that the system may include one or more processors and/or other logic machines and a storage device, such as an instruction storage device. The processors may be adapted to execute instructions from one or more applications, services, programs, routines, libraries, objects, components, data structures, or other logical constructs. Such instructions may be implemented to perform a task, implement a data type, transform the state of one or more components, achieve a technical effect, or otherwise arrive at a desired result. One or more processors may be distributed among two or more separate devices, which may be remotely located and/or configured for coordinated processing. Aspects of the processors may be virtualized and executed by remotely accessible, networked computing devices configured in a cloud-computing configuration.

The instruction storage device may include one or more physical devices, such as data storage devices, may be configured to hold instructions executable by the processor to implement the methods and processes described herein. When such methods and processes are implemented, the state of the instruction-storage machine may be transformed—e.g., to hold different data. The instruction-storage machine may include removable and/or built-in devices; including, for example, optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The data storage device may include volatile, nonvolatile, dynamic, static, read/write, read-only, random-access, sequential-access, location-addressable, file-addressable, and/or content-addressable devices. It will be appreciated that instruction-storage device may include one or more physical devices.

The processors and data storage device may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Engine and/or module, as used herein, include an aspect of a computing system implemented to perform a particular function and may include individual or groups of executable files, data files, libraries, drivers, scripts, database records, etc. In some cases, the engine and/or module may be instantiated via one or more processors executing instructions held by the data storage device. It will be understood that different modules and/or engines may perform from the same application, service, code block, object, library, routine, API, function, etc. Likewise, the same module and/or engine may perform different applications, services, code blocks, objects, routines, APIs, functions, etc. The engines and/or modules may be locally stored and/or remotely stored.

As such, in one example, a computer system may be configured to include a processor or multiple processors (e.g., a central processing unit (CPU), a graphics processing unit (GPU), or both), a main memory and a static memory, which communicate with each other via a bus. The computer system may further include a video display unit (e.g., a liquid-crystal display (LCD) or a cathode ray tube (CRT), and the like). The computer system may also include an alphanumeric input device (e.g., a keyboard, and the like), a cursor control device (e.g., a mouse, touchpad, touchscreen, and the like), a readable drive unit for reading computer readable medium (e.g., USB thumb drive, solid state memory drives, and the like), a signal generation device (e.g., a speaker, and the like (e.g., network interface card, and the like), and a network interface device.

As provided above, a computer-readable medium or data storage device may store one or more sets of instructions and data structures embodying or utilized by any one or more of the methodologies or functions described herein. Additionally, the instructions may also reside, completely or partially, within the main memory and/or within the processors during execution by the computer system. The main memory and the processors may also constitute machine-readable media. Further still, the instructions may be transmitted or received over a network via the network interface device utilizing any one of a number of transfer protocols (e.g., Hyper Text Transfer Protocol (HTTP), etc.). Computer-readable medium may further include, but not be limited to, solid-state memories, optical and magnetic media, and carrier wave signals.

With the above computing system described above, and as described in regards to FIG. 1, the system may include a display, a data input device and an output device.

The system may further include a user attribute identification system. The user attribute identification system may include an attribute detection engine to detect a selected attribute and a customization engine to provide customized features based on the detected attribute. The customization engine may further include or be coupled with a display engine (not shown). It will be appreciated that the attribute detection engine may also include allowing the user to self-identify the selected attribute. For example, a vision impaired user may self-identify themselves as vision impaired. Similarly, a speech impaired user may self-identify themselves as speech impaired via the touch screen. In this way, the speech impaired user may discreetly identify themselves to the user attribute identification system without speaking.

It will be appreciated that the attribute identification engine may be configured with a default setting for each user attribute. In the example above, the attribute identification engine may be configured with a default setting of a user without vision or speech impairments. Therefore, the attribute identification engine may require a vision impairment or speech impairment to be positively identified before the customization engine provides customized features directed to a vision impaired or speech impaired user. For example, a user who is not speech impaired may activate the system without verbalization. Unless the user identifies themselves as speech impaired, the attribute identification engine will not identify the user as speech impaired and the customization engine will not provide customized features for a speech impaired user.

The user attribute may be any identifiable user attribute, including, but not limited to a user's language. For example, the user attribute may be based on determination of a user's native or preferred language. For example, the language may be Spanish, Greek, English, Persian, Mandarin, etc. Regional dialects and accents may further be identified such that the language identification may be more customized to the user. As described in detail in regards to FIGS. 4-7, a user may initiate the interaction with the kiosk through a greeting or other input. Based on the language input, the detection engine may determine the most closely related language, and/or in some embodiments, the dialect or regional accent.

Specifically, in one example, a data input device may include an audio input device for receipt of a first audio greeting from a user where the audio input device is linked to the attribute detection engine to determine language based on the first audio greeting. In some systems, the data input device may further include a digital input device to receive self-identified attribute information. The self-identified attribute information may include home geographic data or language preference based on a user's desire. For example, a user may want to practice or experience a non-native language. As a non-limiting example, a person in Taiwan learning English and about U.S. culture may want to order in Taiwan McDonald's as if in the U.S. The presentation to such a user, after the language preference is identified, is not only the customized output of English, but American English (and possibly regionally specific American English) including customized presentation of a menu as used in the U.S. Other information, such as nutrition information (required by law in the U.S., but not in Taiwan) may also be displayed replicating the cultural experience and presentation as found in the selected region.

Although described primarily in regards to detection of language, other user attributes may be detected, such as age, gender, etc. In some examples, age matching may provide a more customized experience. For example, age detection may identify that a user is over a certain threshold age. In such examples, the font size and initial main screen selections may be adjusted. Further, the linkage to the live operator may be set at a lower threshold such that the user, who may be less familiar with technology, is linked to a live operator more quickly.

Further, in some examples, the detected user attribute may be hearing impairment or visual impairment. For the detection of a hearing-impaired or deaf user, an automatic or semi-automatic connection to a live operator may be used. The live operator may be selected based on the detected user attribute such that the live operator may talk and sign at the same time. The display may further be optimized for the user. With detection of a visually-impaired user, the live operator may use audible interactions. Further, a tactile output device may be used at the display.

In some examples, the detected user attribute may be related to physical condition restraints of a user. Thus, for a user bound to a wheelchair, a remote live operator may be triggered based on a lower threshold trigger. Further, the kiosk may provide direct connectivity to a user device such as a portable computing device or smart phone enabling the wheelchair bound user to directly interact with the remote live operator via the portable computing device.

The user attribute identification may be determined through external source determinations and/or through self-identification. As provided above, a user may use the kiosk as training or learning experience practicing in an alternate language or experiencing a different cultural experience.

Based on the detected user attribute, the customization engine may match the user attribute information with an experience setting to provide a customized output through the display and/or one or more output devices. The experience settings may be stored in a networked database and/or on the local kiosk. For example, the experience setting may provide a customized output with customized features including reformatting of a display to correspond to a geographic specific customization based on a detected language. In some examples, the customized features may include customized interface layout features specific to the user detected attribute.

As a further example, in some systems, the detection engine may be configured to determine two or more attributes, including, but not limited to, language, age, gender, etc. For example, the detection engine may determine a relevant age and a user language. The customization engine may provide customized features based on the detected age and language. In one example, the customization engine may reformat a display to correspond to a geographic specific customization based on language and age using relevant displays and information which matches the detected language (and in some instances accents or dialects) as well as information which matches the cultural experience of the detected age.

The user attribute identification system may further include, in some embodiments, a region or language specific linkage including a routing engine and a connection engine. The routing engine may be adapted to automatically select an operator based on a detected attribute. The connection engine may be configured to electronically connect the selected operator to the kiosk. The customization engine may enable customized two-way audio and visual communication between the selected operator and the user. Additional examples of operation of the routing engine and connection engine are disclosed in regards to FIGS. 4-7.

The region specific linkage may be configured to select an operator through the routing and connection engine where the selected operator may be based on the detected user attribute. For example, the selected operator may be a region-specific operator fluent in the detected user's language.

In other examples, the selected operator may be a specific age to correspond or match with a user detected age attribute. The age correlation may be to enable the selected operator to better relate with the user. In some examples, the selected operator may be a similar age, such as when a user in his late 60s is matched with an operator of approximately the same age. In other examples, a child user may be matched with a selected operator who may correlate to a specified or preferred caregiver age. For example, a child may be matched with a grandmother or grandfather-type where the age is correlated to correlate to a familiar type of relationship or communication style. The age matching may provide a closer emotional tie for better service to the user.

In other embodiments, gender may be a detected user attribute. A selected operator may be matched or correlated to the detected user attribute. For example, a kiosk located in a department store may detect the gender of a user in order to provide customized directions or advice regarding potential products that consumer would be interested in viewing or purchasing.

As provided above, the detected user attribute may be supplemented, in some examples, by input received from the user. For example, the user may be requested to provide additional information regarding their desired experience. For example, a child user may select a "grandmother" relationship such that the child's detected attribute is supplemented with preferred information supplied from the user. Similarly, a female user may select a "girlfriend" relationship such that the female user's detected attribute is supplemented with preferred information supplied from the user. In some examples, the user may be able to select a gender of the operator. For example, for a kiosk located in a shopping store or district, a male may select to have a female operator in order to have assistance on purchasing a gift for his wife.

In some example, additional information regarding the live operator may be provided to the user to enhance the user's experience. For example, in some systems, the name of the live operator may be displayed when the live operator comes on-line to provide another level of personal interactivity and connection.

The user attribute identification system and region specific linkage may reduce queue lines from full service terminals and avoid the high costs of human full service terminals. Further, the availability of the kiosk reduces the frustration of limited service stations and dangerous late night and 24 hour service. The kiosk provides options to address consumer directly and enable assistance through complex services. Moreover, the visual verification through the regional specific linkage addresses and improves security issues with prior kiosk systems.

As a further example, the user detection and region specific linkage may occur in real time. Specifically, in some environments, the kiosk system may replicate the customary experience that the user is accustomed. For example, a kiosk in a fast food ordering environment may require ease of use and short service time. As such, with no history of the user, the kiosk system may detect a user attribute and immediately present a customized output based on the user attribute detection, such as language. Further, in some systems, upon detection of the user attribute, a real time linkage may connect the user to a select live operator to enable fast and customized service to the user.

FIG. 3 illustrates aspects of an example method 200 for the interactive and custom support kiosk. As illustrated, the method may begin by identifying a user's presence at the kiosk, at 202. The user's presences may be identified by user input into the kiosk and/or through a sensor identification of a user in the presence of the kiosk. Any suitable identification sensor or combination of sensors may be used. For example, the sensor may be one or more of a motion sensor to detect motion around the kiosk, an audio sensor to detect audio around the kiosk, etc.

Following identification of a user's presence at the kiosk, a select user attribute may be detected, at 204. The user attribute may be language, age, gender, etc. If the user attribute is not detected, as shown at 206, a user may self-identify and provide information regarding the user attribute.

Once the user attribute is detected, in some examples, at 208, the user may input additional information relative to the user attribute or to the user's preferences tied to the user attribute.

The user attribute may be matched to an experience setting as indicated at 210. Customized output based on the user attribute may be provided to the user at 212.

Figure 4:
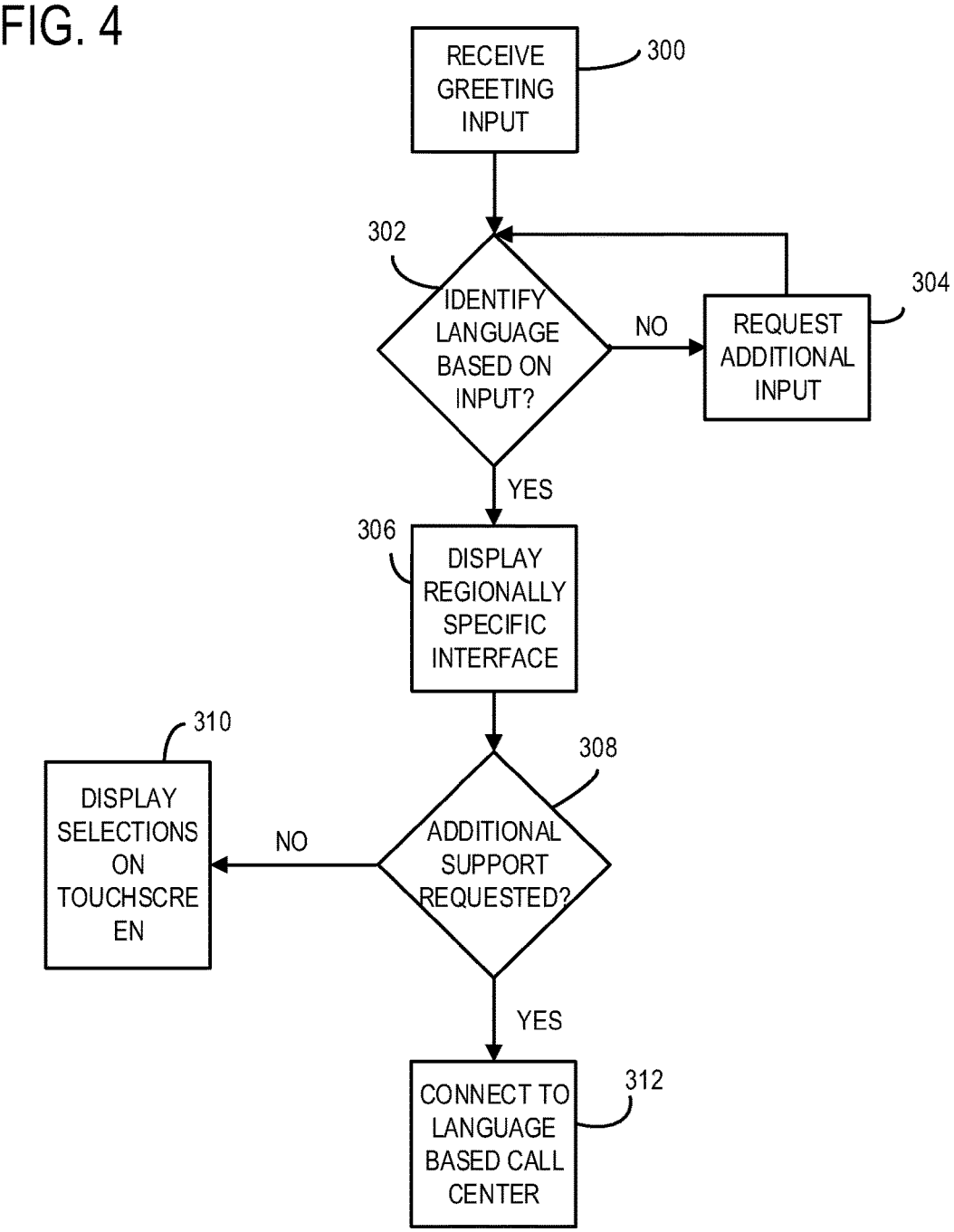
FIG. 4 is a flow chart of an example method for an interactive and custom support kiosk in accordance with an embodiment of the present disclosure.

FIG. 4 shows an exemplary method for user attribute identification system and specifically, a language attribute identification system. At 300, the language identification system activates following detection of user input, described as, but not limited to, detection by microphone 106 of a spoken greeting. At 302, the language identification system identifies the language of the received input and prompts the user to confirm the validity of the categorization through an input request displayed, on, for example, a touch screen. At 304, additional information may be requested via touch screen if language categorization is deemed incorrect or not desired by the user. It will be appreciated that in an event where the language categorization is not determined the kiosk may implement a default language setting. The default language setting may be a language specific to the location of the kiosk, a default language determined by a provider of the kiosk, a default language determined by the manufacturer of the kiosk, or the kiosk may provide a plurality of selectable languages as part of an initial configuration of the kiosk.

Additionally, the kiosk may be configured with default settings for each user attribute identified by the kiosk, thereby allowing the kiosk to select the default attribute setting and continue with the transaction in the event of any indeterminable attribute. In this manner, the kiosk may prevent freezes, infinite loops, or other method execution errors due to one or more indeterminable user attributes. The default settings of the user attributes may insure proper operation of the kiosk in the event of failure of the attribute detection engine to recognize a user attribute such as a failure to recognize a language of the user, the user desires to quickly complete an interaction at the kiosk such as the user skipping to the main menu to quickly order lunch in a restaurant environment or skipping to the main menu to quickly withdraw funds from the kiosk in a banking environment, the user ignores an attribute related prompt or otherwise fails to provide a user attribute to the kiosk, or the user desires to skip all user attribute detection.

At 306, an interface regionally specific to the user, as determined through the language identified, may be displayed on the kiosk display. This regional specificity or customized output, is described as, but not limited to, the language, format, arrangement, and color of displayed information.

In some embodiments, as shown at 308, the language identification system may display a query for additional assistance option to the user. This option, if selected at 308, may link or couple the user to a regionally specific call center 124. The regionally specific call center may be selected based on the detected language.

At 312, audio and visual communication may be established between the kiosk and an operator. The operator further may be selected based on detected user attributes or user inputs. At 308, if additional support is denied by the user, selections may be displayed on touch screen 112.

Figure 5:
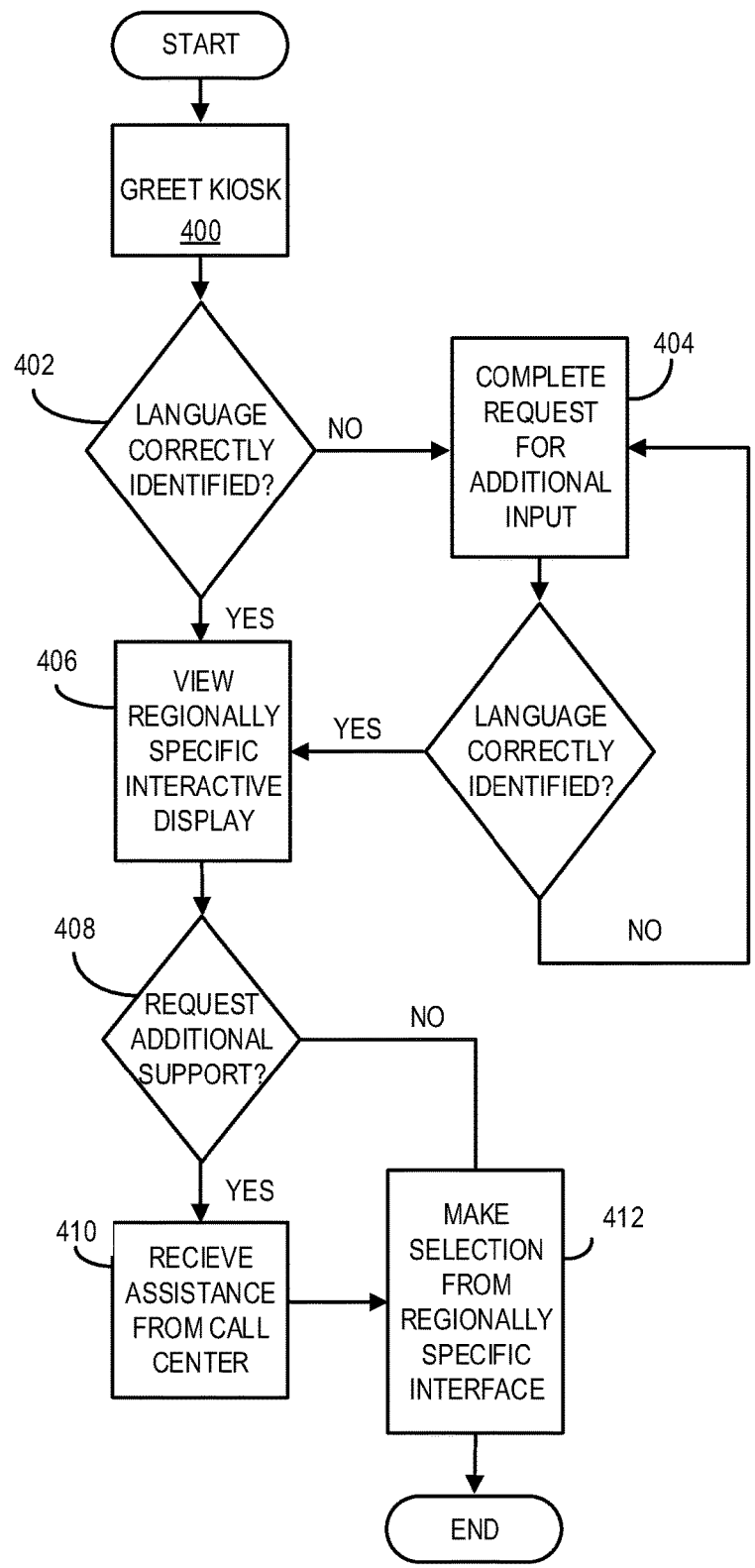
FIG. 5 is a further example of a flow chart of another example method for use of an interactive and custom support kiosk in accordance with an embodiment of the present disclosure.

FIG. 5 shows an exemplary method for user interaction with a language identification system. At 400, a user initiates use of the language identification system though a verbal greeting. The verbal greeting may be prompted to the user through a display. The verbal greeting is detected and matched with a detected language. The detected language may include both general language information and/or regional information, such as accents, etc.

At 402, the user determines if the language identification is correct. At 404, if detected language is incorrect, the user may input additional information and another identification of the language may be presented to the user.

At 406, after the user determines the identified language is correct, the user views an interface regionally specific to the user. This regionally specific interactive display may include customized features corresponding to a geographic specific customization. In some examples, additional user attributes, such as age or gender, may be detected or identified such that the customized features are based on the plurality of user attributes.

In some examples with a region specific linkage, at 408, the user may be offered additional support. At 410, the user may elect to receive additional support and may be connected to a regionally specific call center. A selected operator may be linked to the kiosk based on the user attributes.

The user may visually and verbally communicate with the operator via the language identification system. At 412, the user denies an offer for additional support and makes a selection via the touch screen 112.

Figure 6:
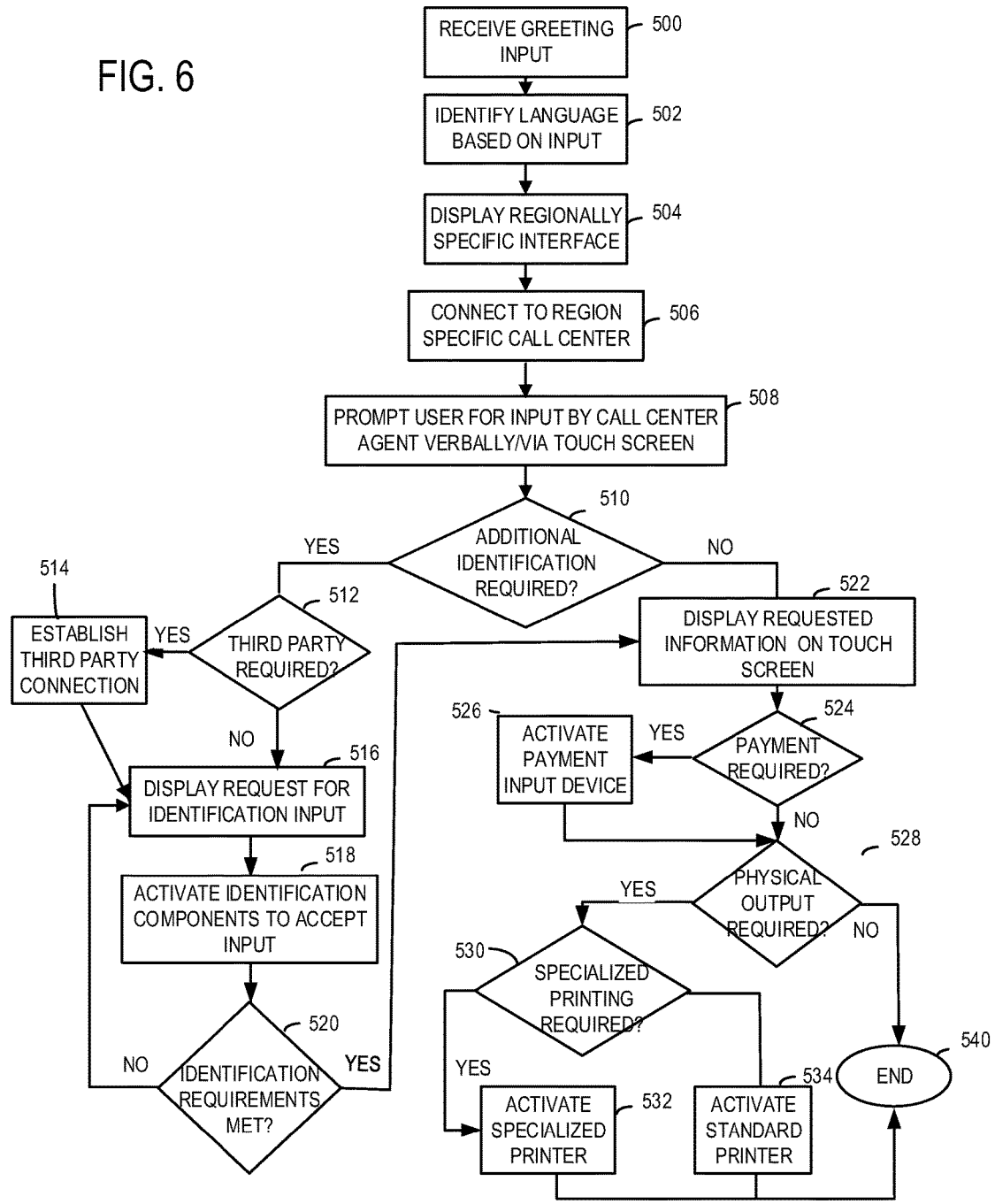
FIG. 6 shows another flow chart of a method for use of an interactive and custom support kiosk in accordance with an embodiment of the present disclosure.

Similarly, FIG. 6 provides another example of use of the interactive and custom support kiosk. As illustrated at 500, a greeting input is received from a user. The language or other attribute may be based on the interaction with the kiosk, at 502.

As shown at 504, in some examples, the language may be detected and a regionally specific interface may be displayed to a user of the kiosk. With a request for additional assistance, a user may be connected to a region specific call center, at 506. A selected operator may be matched with the user based on the user's attributes. The selected operator may prompt user for input, as indicated at 508. The operator prompts may include interactive support through audio, visual, video, etc.

In some embodiments where the kiosk is used for a secure output, additional indication information may be requested or required, indicated at 510. In some examples, a third party may be required for verification purposes, at 512. For example, for increased security, a visual validation step may be implemented through third party verification. The third party connection may be established (at 514) and a display request for identification may be received at the kiosk (at 516). Depending on the type of identification verification, kiosk components may be activated to accept input as shown generally at 528. If the identification requirements are met (at 520), requested information may be displayed on the touch screen, indicated at 522.

In some embodiments, a payment may be required as shown at 524. A payment input device may be activated and a user may input payment, such as through a credit card, cash, or other payment system.

A physical output may be required or desired, as shown at 528. For example, specialized printing may be required, at 530, and a specialized printer may be activated (at 532). Alternatively, standard printing may suffice and a standard printer may be activated, as indicated at 534.

As a non-limiting example, the kiosk described herein may provide a Taiwanese visitor in Moscow the option to experience services in Moscow substantially identical to the experience the user is accustomed to in Taiwan. For example, the kiosk may enable the Taiwan visitor to walk into a fast food restaurant, such as McDonalds and order food as though the Taiwan visitor was in a Taiwan McDonalds. The language is not simply translated, but instead a cultural experience setting is replicated to provide ease of use and comfort to the visitor. The experience setting may include customized output such as menu format changes, menu descriptions adapted to the Taiwanese style, etc. In addition to customizing the food ordering interface to the individual visitor, the kiosk may also customize the visitor's food order to the restaurant kitchen. In particular, the kiosk may customize the visitor's food according to the visitor's personal and cultural parameters. For example, the user may have a dietary restriction such that the food order is prepared according to the restriction to provide further comfort to the visitor. Dietary restrictions may include vegetarian, vegan, kosher, and halal, among others. Further, in some examples, a user may request presentation of options which meet a dietary restriction or preference. In another example, the user may desire a particular flavor which may be included in the food order as well. The flavor may be a user-preference or a region specific flavor or additive.

Figure 7:
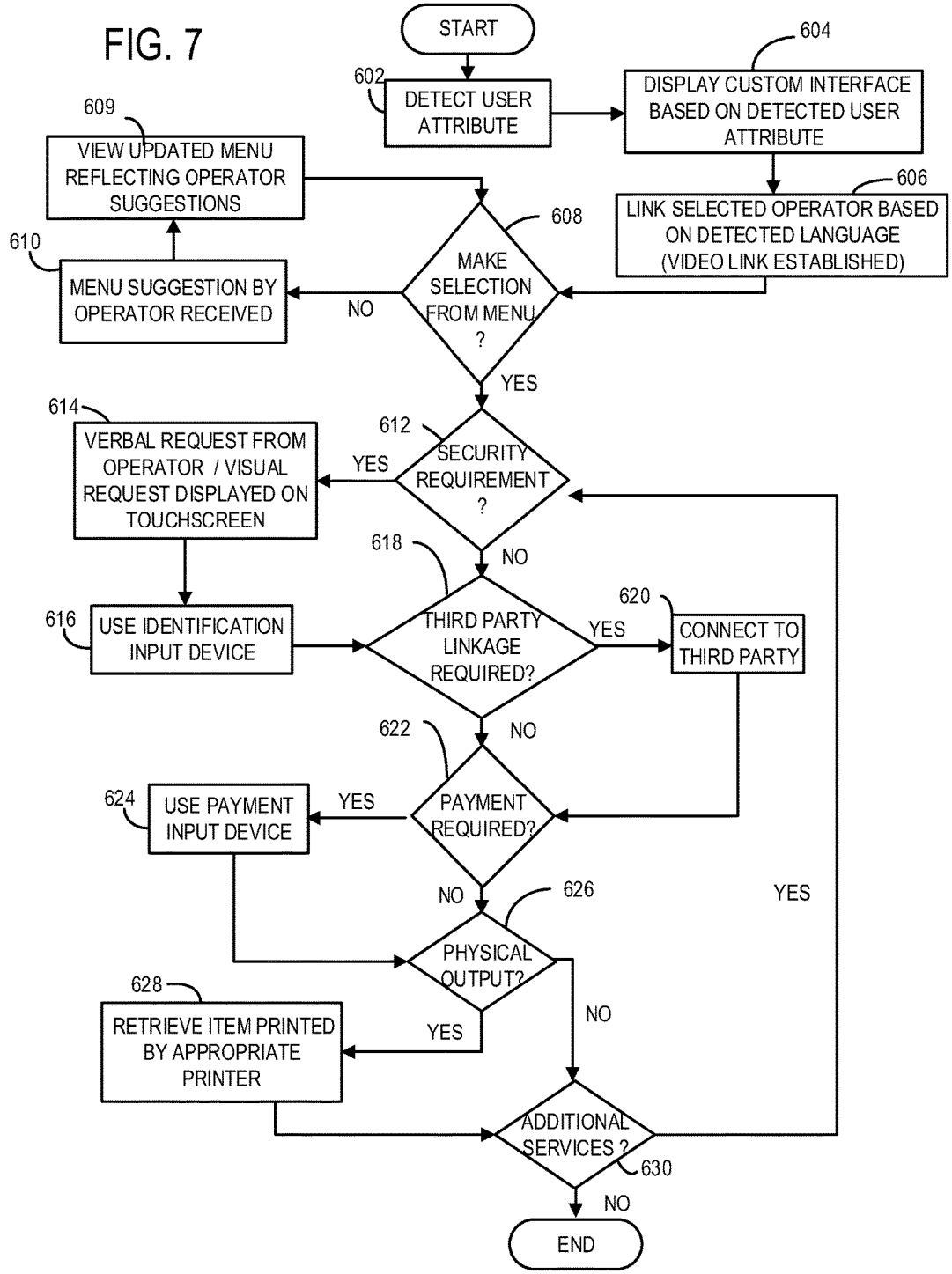
FIG. 7 shows another flow chart of a method for use of an interactive and custom support kiosk in accordance with an embodiment of the present disclosure.

FIG. 7 provides another illustration of an example use embodiment for the interactive and custom support kiosk. As shown at 602, a user may greet the kiosk or otherwise be presented to the kiosk for detection of a user attribute. The terminal may be a self-service or point of sales terminal. Based on the detection of the user attribute, such as language, a custom interface may be displayed at 604.

In some examples, the kiosks may have built in real time two-way audio/video capability. This two way audio/video capability enables real time live help or assistance. Further, in some examples, an agent may also greet the user in the language of the initial greeting (video link established, at 606). The user may trigger the audio/video service through request or prompt.

In one example, a menu may be presented to a user, at 608. If the user is unable to make a selection, a suggestion or direction may be suggested by the operator, as indicated at 610. The operator may provide an updated menu or display reflecting the operator's suggestions or directions, as shown at 611. In such a manner, the user may interact with the kiosk.

If a user makes a selection from the menu, in some examples, identification may be required or requested, as indicated at 612. As indicated at 614 and 616, a user may input identification information through an identification input device.

At 618, the method continues, where in some embodiments, a third party verification or interaction may be required or requested. If a third party verification is requested, the routing engine and connection engine may connect to the third party, as illustrated at 620.

Further, in some systems, a payment may be required, shown at 622. A payment input device may be used, as shown at 624.

If a physical output is required, at 626, the output device may issue the physical output. For example, a specialty print, receipt or ticket may be issued, as indicated at 628. The receipt or other output may be customized to the user's target language as a customized output.

If no additional print is necessary, additional selections may be offered by the operator, as indicated at 630. For example, the automated method may provide recommendations and specials. Further, in some examples, screen space may be available for advertisements or public messaging. Moreover, in some systems, interactive animations or video may be displayed to the user. For example, in a fast food ordering environment, video or animation may be shown on a selected item to show how the item is made or put together which provides the user a better idea of what is being ordered. The display menu may further show nutritional content and total calories for the order.

It will be appreciated that the interactive and custom support kiosk may include a selectable option to allow a user to bypass the user attribute determination system and region-specific linkage functionalities described in the embodiments above. Upon a selection to bypass, the kiosk may present the user with a default interface based upon the default setting for each user attribute allowing the user to proceed with a transaction without implementation of the user attribute based customized experience. For example, an interactive and custom support kiosk may provide automated banking services. A user may then perform their desired automated banking without providing additional information about himself/herself. The selectable bypass option may then provide the user with the user desired automated banking options without further inquiry to user attributes. In another example, a user may have insufficient time to allow for a user attribute based experience, such as ordering food on a lunch break. Therefore, the user may select to bypass the user attribute determination steps and proceed directly to the ordering menu and place a lunch order.

FIG. 8 provides a simplified illustration of the interactive and custom support kiosk 800 including display 808, input device 809, and output device 814. As shown the interactive and custom support kiosk may be a standalone device. In some examples, the kiosk may be integrated within a counter or other terminal. Depending on the service of the kiosk, the kiosk may be located at a place of service or at a remote vending site.

In other examples, the kiosk may be shaped to provide a more interactive experience. For example, the kiosk may be shaped in the form of a human or animal. For example, as illustrated in FIG. 9, a kiosk 900 may be a life-sized person where the face is a display 908 or video screen, referred to herein as the face display. The display 908 may be configured to present the image or face of a live operator. The kiosk 900 may be humanoid by having the appearance of a human form. For example, a kiosk 900 may be dressed as a McDonald restaurant cashier. The kiosk 900 may hold data input device 909 or touch screen tablet where the customer can enter information and selections. Before a live operator is triggered, the face display may present a generic smiling person. The live operator may be triggered through the region specific linkage discussed above where the face display converts to the live operator face. Video and audio output may enable a user to have an interactive experience with the live operator. In some examples, an output device 914 may be provided. For example, the kiosk 900 may be positioned at a ticket counter and may provide options for a user to purchase tickets. The user attribute identification system may allow a user to immediately interact with the kiosk based on detection of an attribute, such as language. The kiosk may link through a region specific linkage to enable a user to engage with a selected live operator based on the attribute. The live operator may then appear in the face display providing an interactive and customized experience for the user.

As another example, the kiosk may be in the shape of a robot or other figure. For example, the kiosk may be shaped in the form of a cartoon character, make-believe character, or other recognizable form.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An interactive and custom support kiosk comprising:
a data input device,
a display screen linked to the data input device,
a computing device of the kiosk coupled to the data input device and the display screen,
an attribute detection engine of the computing device configured to detect at least one user attribute based on user input received at the kiosk via the data input device of the kiosk, wherein the at least one user attribute includes user-preferred geographic data, and
a customization engine of the computing device configured to display a cultural experience setting menu on the display screen responsive to detecting the at least one user attribute, the cultural experience setting menu including selectable content, and the cultural experience setting menu matching cultural parameters of the user-preferred geographic data, wherein the cultural parameters include a menu layout, menu information, and a language replicating a cultural experience,
wherein the cultural experience setting menu includes a customized output changing the menu layout and the menu information to be adapted to a style that is displayed in a geographic location associated with the user-preferred geographic data, and
wherein the attribute detection engine and the customization engine of the computing device are program instructions stored in a storage device of the kiosk and executed by a processor of the kiosk.

2. The interactive and custom support kiosk of claim 1, wherein the at least one user attribute further includes a dietary restriction, and wherein a set of content used for the selectable content of the cultural experience setting menu is further based on the dietary restriction.

3. The interactive and custom support kiosk of claim 1, wherein at least one additional user attribute includes a user age, and wherein customized features of the cultural experience setting menu include reformatting the display screen to correspond to a geographic specific customization based on the user-preferred geographic data and the user age.

4. The interactive and custom support kiosk of claim 1, wherein the data input device includes an audio input device for receipt of a first audio greeting from a user, and wherein the audio input device is linked to the attribute detection engine to determine a user language based on the first audio greeting.

5. The interactive and custom support kiosk of claim 4, wherein the data input device further includes a digital input device to receive self-identified attribute information.

6. The interactive and custom support kiosk of claim 5, wherein customized features of the cultural experience setting menu include reformatting a layout and a content of the display screen to correspond to a geographic specific customization based on the user language and home geographic data.

7. The interactive and custom support kiosk of claim 1, wherein customized features of the cultural experience setting menu are interface layout features.

8. The interactive and custom support kiosk of claim 1, further comprising a region specific linkage, the region specific linkage including a routing engine of the computing device that is configured to automatically select an operator based on the language, and a connection engine of the computing device configured to electronically connect the selected operator to the kiosk and establish communication between a user at the kiosk and the operator,
wherein the routing engine and the connection engine of the computing device are program instructions stored in the storage device of the kiosk and executed by the processor of the kiosk.

9. The interactive and custom support kiosk of claim 8, wherein a display engine provides two-way audio and visual communication between the selected operator and the user at the kiosk.

10. The interactive and custom support kiosk of claim 8, further comprising a display engine as part of the customization engine to display the selected operator to the user at the kiosk.

11. The interactive and custom support kiosk of claim 8, wherein the connection engine is configured to electronically connect the kiosk to a personal computing device.

12. A method for use of an interactive and custom support kiosk, comprising:
receiving a spoken greeting from a user via a microphone;
matching the spoken greeting to a user-preferred language; and
via a computing device coupled to the microphone and a display screen,
automatically displaying selectable content in a cultural experience setting menu, the cultural experience setting menu matching cultural parameters, wherein the cultural parameters include content in the user-preferred language and a menu layout associated with a geographic location of the user-preferred language, the cultural experience setting menu including a customized output changing the content and the menu layout to be adapted to a style that is displayed in the geographic location.

13. The method of claim 12, wherein the cultural parameters further include region specific options.

14. The method of claim 13, wherein the region specific options include food options that are based on cultural dietary restrictions associated with the user-preferred language.

15. The method of claim 12, wherein matching the spoken greeting to the user-preferred language includes matching the spoken greeting to a dialect of the user-preferred language.

16. An interactive and custom support kiosk, comprising:
a display screen;
a data input device linked to the display screen;
a computing device coupled to the display screen and the data input device, the computing device including a processor and a storage device;
a user attribute identification system that includes the data input device;
an attribute detection engine configured to detect a language and at least one additional attribute based on user input received via the data input device, the at least one additional attribute including an age of a user;
a customization engine configured to display selectable content in a cultural experience setting menu with customized features via the display screen of the kiosk based on the language and based on the at least one additional attribute which includes the age of the user, the cultural experience setting menu matching cultural parameters, wherein the cultural parameters are geographically-based parameters replicating a cultural experience, the cultural parameters including a menu layout and menu information associated with a geographic location of the language, and wherein the cultural experience setting menu includes a customized output changing the menu layout and the menu information to be adapted to a style displayed in the geographic location;
a region specific linkage, including a routing engine configured to automatically select a region-specific call center from a plurality of call centers based on the detected language and based on the at least one additional attribute which includes the age of the user while balancing a load of the plurality of call centers; and
a connection engine configured to electronically connect an operator at the selected region-specific call center to the kiosk and establish communication between the operator and the user at the kiosk, wherein the connection engine is further configured to connect with a portable computing device,
wherein the attribute detection engine, the customization engine, the routing engine, and the connection engine are program instructions stored in the storage device and executed by the processor.

17. The interactive and custom support kiosk of claim 16, wherein the data input device includes an audio input device for receipt of a first audio greeting from the user, and wherein the audio input device is linked to the attribute detection engine to determine the language based on the first audio greeting.

18. The interactive and custom support kiosk of claim 16, wherein the data input device further includes a digital input device to receive the user input.

\* \* \* \* \*